(12) United States Patent
Abeles

(10) Patent No.: US 9,629,341 B2
(45) Date of Patent: Apr. 25, 2017

(54) METHOD FOR INHIBITING SHORE EROSION

(71) Applicant: Gary E Abeles, Verona, NJ (US)

(72) Inventor: Gary E Abeles, Verona, NJ (US)

(*) Notice: Subject to any disclaimer, the term of this patent is extended or adjusted under 35 U.S.C. 154(b) by 15 days.

(21) Appl. No.: 14/203,872

(22) Filed: Mar. 11, 2014

(65) Prior Publication Data

US 2014/0261192 A1 Sep. 18, 2014

Related U.S. Application Data

(60) Provisional application No. 61/786,721, filed on Mar. 15, 2013.

(51) Int. Cl.
*E02B 3/12* (2006.01)
*A01K 31/12* (2006.01)

(52) U.S. Cl.
CPC .............. *A01K 31/12* (2013.01); *E02B 3/125* (2013.01)

(58) Field of Classification Search
CPC ................................. A01K 31/12; E02B 3/122
See application file for complete search history.

(56) References Cited

U.S. PATENT DOCUMENTS

| | | | | |
|---|---|---|---|---|
| 4,353,946 A * | 10/1982 | Bowers | .................... | E02D 17/20 405/15 |
| 5,338,131 A * | 8/1994 | Bestmann | ................ | E02B 3/125 405/15 |
| 5,641,244 A * | 6/1997 | Bestmann | ................ | E02B 3/125 405/15 |
| 6,293,045 B1 * | 9/2001 | Morgan | .................. | C09K 17/52 47/1.01 F |
| 8,024,890 B2 * | 9/2011 | Bertin | ................... | A01G 9/1086 47/9 |
| 8,256,160 B2 * | 9/2012 | Rubin | ................... | A01G 31/001 47/58.1 SC |
| 2005/0235558 A1 * | 10/2005 | Carrillo | .................. | A01C 1/046 47/56 |
| 2006/0291963 A1 * | 12/2006 | Theisen | .................. | E02D 17/20 405/302.7 |

\* cited by examiner

*Primary Examiner* — Tara M. Pinnock
(74) *Attorney, Agent, or Firm* — Maine Cernota & Rardin

(57) ABSTRACT

A method for inhibiting erosion at a coastal location includes inducing coastal vegetation to take root in a site-compatible mat including a biodegradable mat combined at most with fertilizer, sand, and/or soil. After the coastal vegetation has taken root in the site-compatible mat, the mat is placed on the coastal location, and the coastal vegetation is allowed to take root as the biodegradable mat decomposes. In embodiments, the coastal location can be a flat area of sand, or a constructed or naturally occurring sand dune. The site-compatible mat can include fertilizer and/or coir, which can be brown coir. The mat can include and/or be covered by sand or soil having a composition that is substantially equivalent to sand or soil that is indigenous to the coastal location. Bird roosting stakes can be planted through the mat.

12 Claims, 5 Drawing Sheets

METHOD FOR INHIBITING SHORE EROSION

RELATED APPLICATIONS

This application claims the benefit of U.S. Provisional Application No. 61/786,721, filed Mar. 15, 2013, which is herein incorporated by reference in its entirety for all purposes.

FIELD OF THE INVENTION

The invention relates to beach and similar environment erosion control methods, and more specifically to the use of specialized sod in conjunction with man-made or natural dunes to control erosion.

BACKGROUND OF THE INVENTION

Shoreline erosion is a growing concern for those who live in coastal areas. Many beaches today are losing shoreline at a rate of 2-6 feet per year. Severe weather patterns exacerbate this issue, and can result in the loss of large portions of shoreline in a very brief time. It has been predicted by some that the severity of the weather will increase in the coming years, making this issue even more important. The loss of shoreline has a detrimental impact on property values, since property may be difficult to sell when there is a chance that erosion will eventually cause the property to become unlivable. Also, sudden erosion due for example to a storm can also pose a danger to those residing in such areas.

Loss of shoreline also negatively impacts coastal marine organisms living in these areas, since marine life, especially coastal marine life, may become buried and die off. Marine life is also affected when coastal erosion causes contaminants such as oil to be released into the water.

Existing methods of controlling beach erosion include building retention walls, groins, and revetments to impede the erosion process. Retention walls are large structures which are designed to stop high tides from hitting the beach, generally running parallel to the shoreline and located hundreds of feet out into the sea. Groins are structures that extend into the ocean from the beach and are oriented perpendicularly to the shoreline. Whereas a retention wall typically stands alone, groins tend to be used in conjunction with many other groins, and are typically placed at substantially regular intervals along the length of the beach. They function by trapping sand that is pulled at an angle from the beach by cross currents, and would otherwise be pulled out to sea by the tide. Revetments are man-made structures placed on slopes at the water's edge that are designed to absorb the impact of the tides.

These methods of controlling erosion all cause sediment deposits to occur, and do not prevent the removal of sand from other areas of the beach. These methods also cause destruction of shoreline vegetation, further destabilizing the shoreline.

Other methods of shoreline erosion control include construction of jetties and bulkheads, building of sand dunes and growing of vegetation on and around them, and adding additional sand to the beach periodically to counteract the effects of erosion that has already occurred.

Bulkheads are substantially vertical structures, whose heights are generally several times taller than their widths, with lengths that run parallel to, and the length of, the coastal land that is to be protected from erosion. They are made of a material of sufficient strength to resist the impact of the tide. They are generally used for providing stability to steep slopes, and are thus not suitable for preventing erosion of the beach front itself, but can help prevent erosion from extending landward from the beach front.

Jetties are long structures, generally employed in pairs, which extend substantially perpendicularly from the shoreline and are built at the mouths of inlets. They are mainly designed to push sediment further from the mouth of the inlet, where deeper waters make this less of an issue. As a side benefit, they also trap sand and provide some measure of beach erosion control to adjacent areas, by reducing the effects of along-shore drift. This however, causes the same issue of destroying shoreline vegetation as previously discussed measures.

Addition of sand on a periodic basis can be expensive and difficult, and also causes burial and destruction of shoreline vegetation. Construction of sand dunes and growing of vegetation around them provides an aesthetically pleasing and effective method of controlling shoreline erosion, but the vegetation must be planted and cared for during the critical first few months, to ensure that the project is successful. Such freshly planted vegetation is also not as robust as mature or semi-mature vegetation, and is more likely to perish if conditions become harsh before the vegetation has a chance to grow and strengthen itself. This limits the time periods when this technique can be utilized, since the vegetation must be planted at a time when conditions can be expected to remain ideal long enough for the vegetation to mature.

Typical sod has been around for quite some time, and allows for growth of grass seedlings offsite and transportation of the mature or semi-mature grass, along with its root structure and soil, to another site, where it can be quickly incorporated into the existing landscape. Traditional sod would not be suitable for a beach environment, where it would be exposed to sand and salt on a regular basis.

Currently, there exists a coir mat that contains un-sprouted sea grass seeds. This coir mat is used to control erosion of steep hills, such as those near roadways. Although this is a durable, biodegradable, and aesthetically appealing solution, it does not alleviate the issue of extended maintenance and care until the vegetation eventually becomes self-sustaining.

Coir mats with traditional grass pre-grown therein is sometimes used as an "instant lawn." However, this approach would not be suitable for use in a saltwater environment, since the grass would not thrive in sand, and would not tolerate extended exposure to salt.

What is needed, therefore, is a method for introducing self-sustaining, shoreline-tolerant vegetation to coastal areas so as to minimize the impact of erosion on the shoreline and its ecosystem, without requiring an initial maintenance period, and without introducing permanent, artificial structures into the environment.

SUMMARY OF THE INVENTION

The present invention is a method for introducing self-sustaining, shoreline-tolerant vegetation to coastal areas so as to minimize the impact of erosion on the shoreline and its ecosystem. According to the invention, the shoreline-tolerant vegetation is allowed to sprout and take root in a biodegradable mat under controlled conditions. In embodiments, the vegetation is sea grass. In various embodiments, the mat is constructed from coir. When the vegetation is sufficiently matured to be self-sustaining, the mat is transferred to the shoreline, where in some embodiments it is draped over a sand dune. The sand dune can be either a naturally occurring sand dune or a man-made sand dune.

In some embodiments, fertilizer is included with the mat. In other embodiments, bird roosting stakes are planted with the mat so as to encourage birds to roost over the mat, and to provide natural fertilizer to the vegetation.

As the vegetation takes root in the underlying sand, the biodegradable mat slowly degrades and is absorbed non-destructively into the environment, leaving behind firmly established vegetation that provides self-sustaining erosion control without human maintenance. If roosting stakes are included, they can be removed once the vegetation is well established, or they can be allowed to remain as an ongoing benefit to the birds.

One general aspect of the present invention is a method for inhibiting erosion at a coastal location. The method includes providing a biodegradable mat, inducing costal vegetation to become fixed in the biodegradable mat, so that the vegetation extends upward from the biodegradable mat, placing the biodegradable mat on the costal location; and allowing the coastal vegetation to take root in the costal location as the biodegradable mat decomposes.

In embodiments, the coastal location is substantially flat. In some embodiments, the coastal location is an area of sand. In other embodiments, the coastal location is a constructed or naturally occurring sand dune.

In various embodiments the biodegradable mat includes coir. In certain embodiments the biodegradable mat includes brown coir. In some embodiments, the coastal vegetation is sea grass.

Embodiments further include including fertilizer in the mat. Some embodiments further include planting at least one bird roosting stake through the biodegradable mat at the coastal location, so that birds will provide natural fertilizer to the vegetation. Other embodiments further include including sand or soil with the biodegradable mat, the included sand or soil having a composition that is substantially equivalent to sand or soil that is indigenous to the coastal location.

And certain embodiments further include covering the biodegradable mat with a layer of sand or soil.

Another general aspect of the present invention is an apparatus for inhibiting erosion of a coastal location. The apparatus includes a biodegradable mat, and costal vegetation fixed in the biodegradable mat, said coastal vegetation extending upward from the biodegradable mat, said costal vegetation being sufficiently mature to be self-sustaining.

In embodiments, the biodegradable mat includes coir. In some embodiments, the biodegradable mat includes brown coir. In various embodiments, the coastal vegetation is sea grass.

Embodiments further include fertilizer included in the mat. Certain embodiments further include at least one bird roosting stake, the bird-roosting staking being implantable through the biodegradable mat into underlying terrain, so that birds will provide natural fertilizer to the vegetation.

And various embodiments further include at least one of sand and soil included with the biodegradable mat, the included sand or soil having a composition that is substantially equivalent to sand or soil that is indigenous to the coastal location.

The features and advantages described herein are not all-inclusive and, in particular, many additional features and advantages will be apparent to one of ordinary skill in the art in view of the drawings, specification, and claims. Moreover, it should be noted that the language used in the specification has been principally selected for readability and instructional purposes, and not to limit the scope of the inventive subject matter.

DETAILED DESCRIPTION

Figure 1:
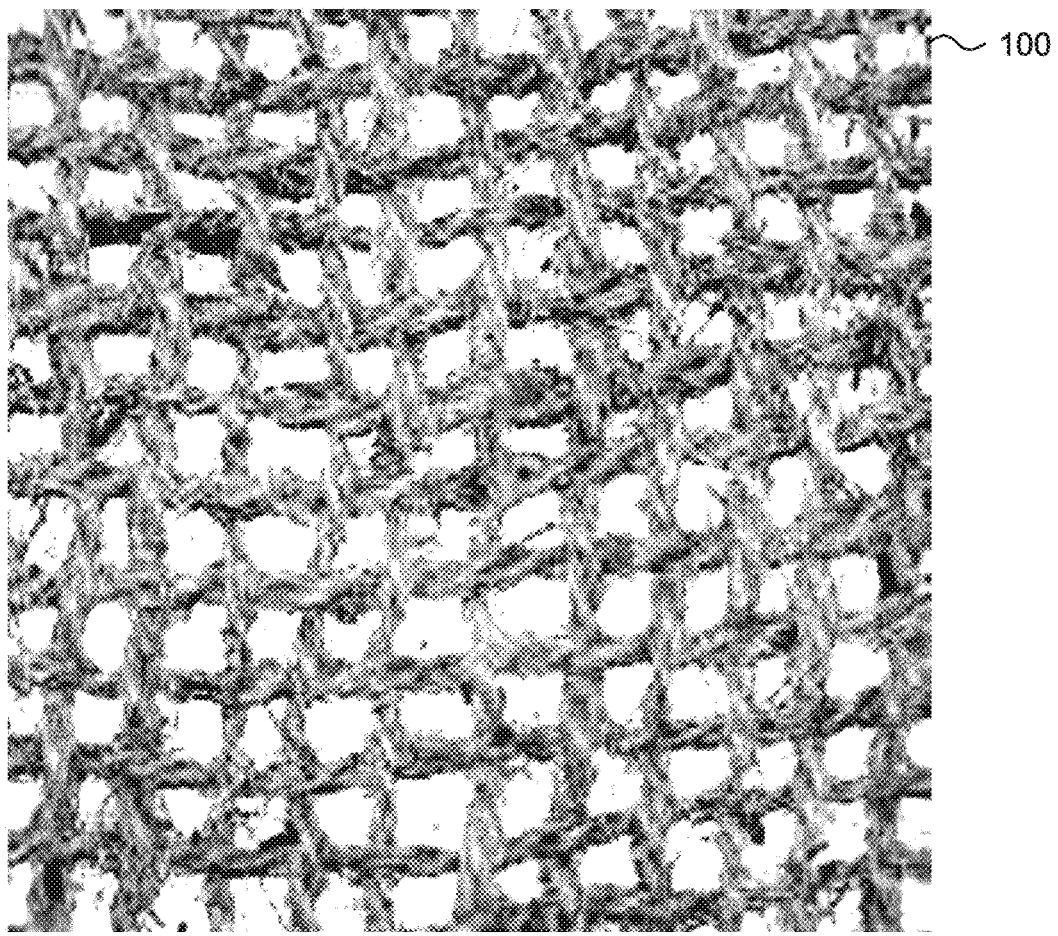
FIG. 1 is a top view of coir fiber webbing.
Figure 2:
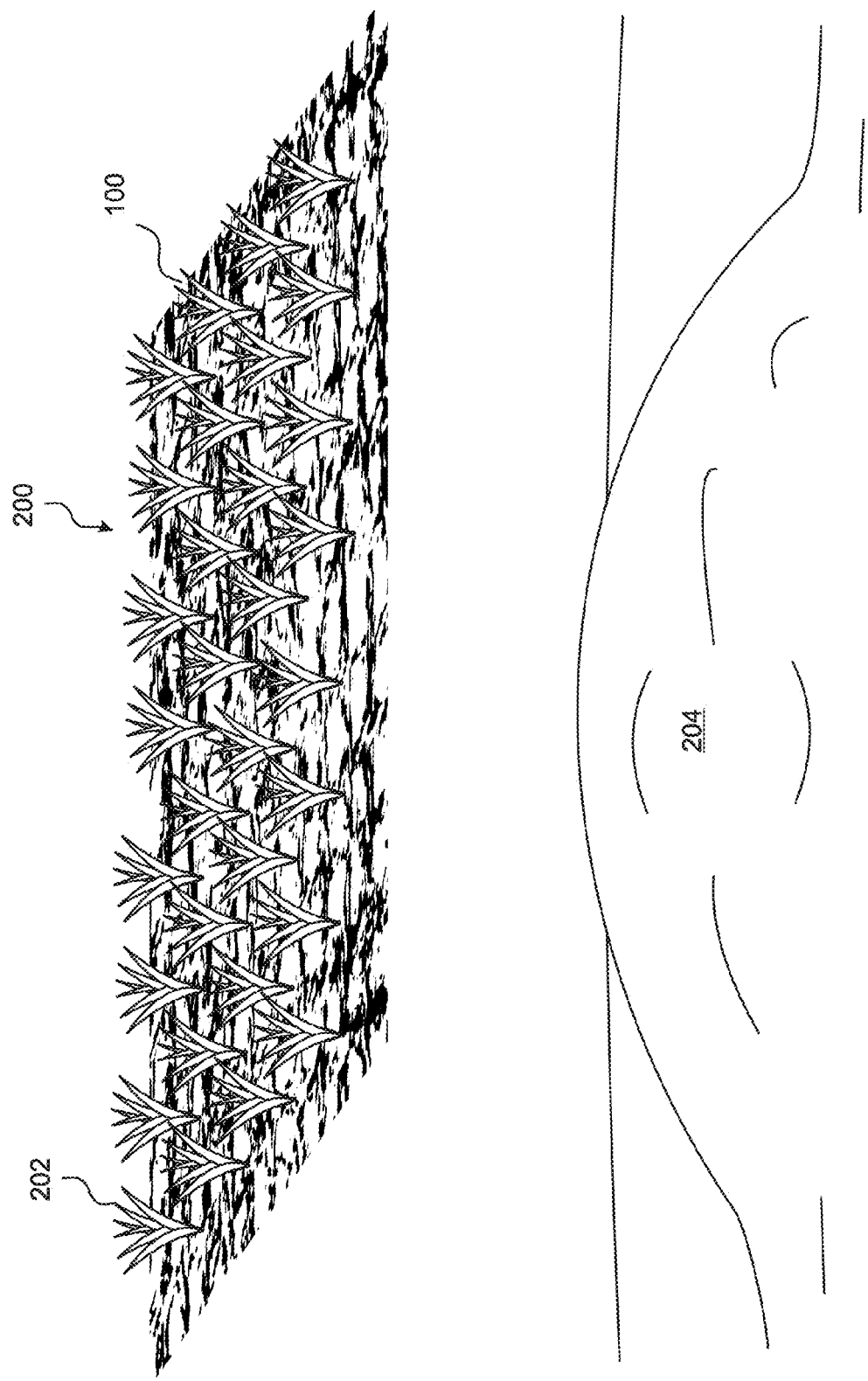
FIG. 2 is a partially exploded perspective view of an embodiment of the present invention showing a coir sod mat, with mature sea grass extending therefrom, the sod mat being positioned over a sand dune.
Figure 3:
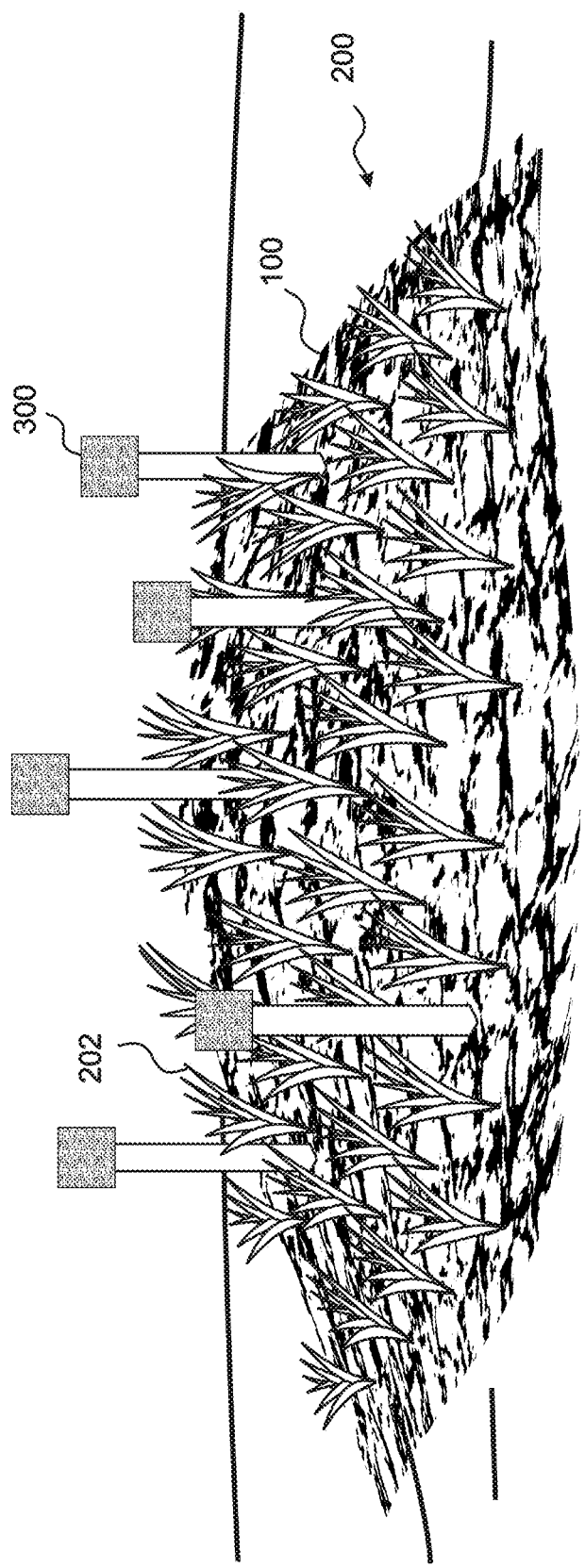
FIG. 3 is a perspective view of the embodiment shown in FIG. 2, showing the mat placed on the dune and conformed to the shape of the dune.

The present invention is a method for introducing self-sustaining, shoreline-tolerant vegetation to coastal areas, so as to minimize the impact of erosion on the shoreline and its ecosystem. With reference to FIGS. 1 and 2, an eco-friendly sod mat 200 is prepared by allowing shoreline-tolerant vegetation 202 to sprout and take root in a biodegradable mat 100 under controlled conditions. In the embodiment of FIGS. 1 and 2, the mat is made from coir, and in the embodiment of FIG. 2, the vegetation 200 is sea grass. When the vegetation 202 is sufficiently mature to be self-sustaining, the sod mat 100 is transferred to the shoreline, where in some embodiments it is draped over a sand dune 204, as illustrated in FIG. 3. The sand dune 204 can be either a naturally occurring sand dune or a man-made dune.

In some embodiments, fertilizer is included with the mat. In other embodiments, bird roosting stakes 300 are planted with the sod mat 200 so as to encourage birds to roost over the sod mat 200 and to provide natural fertilizer to the vegetation 202.

Figure 4:
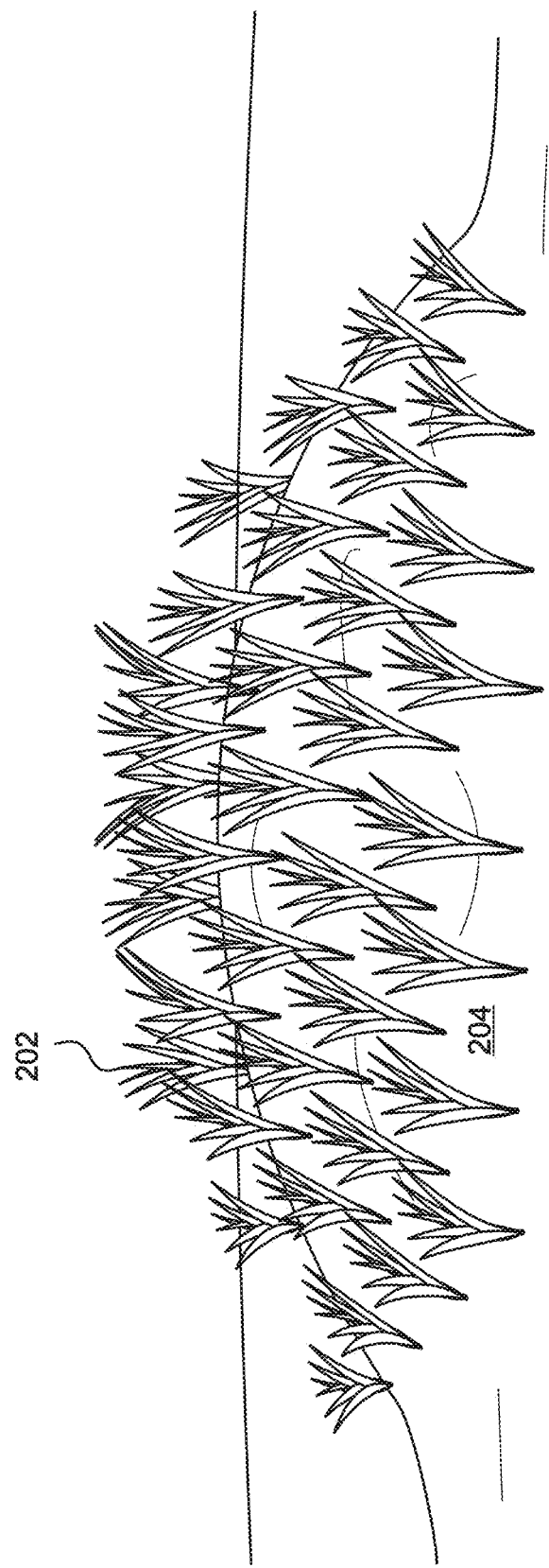
FIG. 4 is a perspective view of an embodiment of the present invention showing the dune with sea grass growing, after the fibrous material and fertilizer have degraded and been absorbed.

As the vegetation takes root in the underlying sand, the biodegradable mat 100 slowly degrades and is absorbed non-destructively into the environment. As is illustrated in FIG. 4, the firmly established vegetation 202 is left behind to provide self-sustaining erosion control without human maintenance. If roosting stakes 300 are included, they can be removed once the vegetation 204 is well established, or they can be allowed to remain as an ongoing benefit to the local birds.

Figure 5:
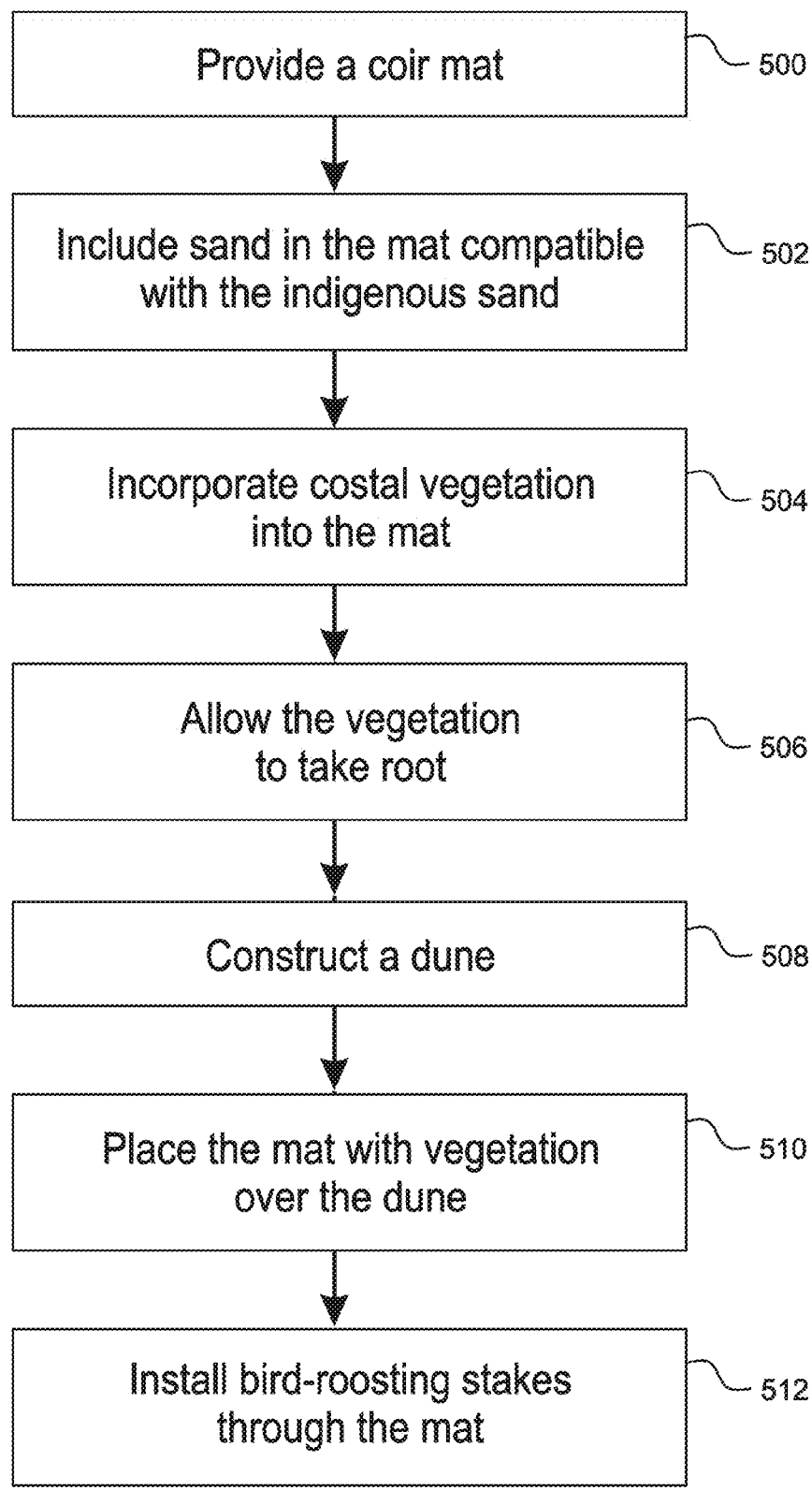
FIG. 5 is a flow diagram illustrating the steps of an embodiment of the present invention.

FIG. 5 is a flow diagram that illustrates an embodiment of the present invention. First, a biodegradable mat is provided 500, which in this embodiment is a coir mat. Sand and/or soil can be included with the mat 502, where the sand and/or soil is similar to the sand and/or soil that is found at the coastal site, or at least has properties such as pH and grain size that are similar to the sand and/or soil at the coastal site. Coastal vegetation is then incorporated into the mat 504, either by allowing seeds to sprout in the sand and/or soil within the mat, or by first sprouting the vegetation and then transplanting it into the mat. As the vegetation takes root in the sand and/or soil included with the mat 506, it becomes acclimated to the specific properties of the sand and/or soil, and so it more likely to thrive when it ultimately takes root at the coastal site.

At some point, a specific coastal site is chosen for conservation. In the embodiment of FIG. 5, a sand dune is constructed at the site 508. In other embodiments, an existing dune is selected, or a substantially flat region of sand and/or soil is selected. The mat with the vegetation is then placed on the selected site 510. It may simply be placed on top of the site, or buried under a thin layer of sand and/or soil, so long as the vegetation is sufficiently exposed. In the embodiment of FIG. 5, bird-roosting stakes are then inserted through the mat and into the underlying sand and/or soil 512. As birds take opportunistic advantage of the stakes, they naturally supply fertilizer to the vegetation.

The foregoing description of the embodiments of the invention has been presented for the purposes of illustration and description. It is not intended to be exhaustive or to limit the invention to the precise form disclosed. Many modifications and variations are possible in light of this disclosure. It is intended that the scope of the invention be limited not by this detailed description, but rather by the claims appended hereto.

What is claimed is:

1. A method for inhibiting erosion at a coastal location, the method comprising:
   providing a site-compatible biodegradable mat, wherein said mat does not include any elements that would introduce a permanent, artificial structure into the coastal location;
   inducing costal vegetation to take root exclusively in the site-compatible mat, so that the vegetation extends upward from the site-compatible mat;
   after the coastal vegetation has taken root in the site-compatible mat, placing the site-compatible mat unrolled and substantially flat on the costal location; and
   allowing the coastal vegetation to take root in the costal location as the biodegradable mat decomposes.

2. The method of claim 1, wherein the coastal location is substantially flat.

3. The method of claim 1, wherein the coastal location is an area of sand.

4. The method of claim 1, wherein the coastal location is a constructed or naturally occurring sand dune.

5. The method of claim 1, wherein the biodegradable mat includes coir.

6. The method of claim 1, wherein the biodegradable mat includes brown coir.

7. The method of claim 1, wherein the coastal vegetation is sea grass.

8. The method of claim 1, wherein fertilizer is included in the site-compatible mat.

9. The method of claim 1, further comprising planting at least one bird roosting stake through the biodegradable mat at the coastal location, so that birds will provide natural fertilizer to the vegetation.

10. The method of claim 1, wherein at least one of sand and soil is included in the site-compatible mat, the included at least one of sand and soil having a composition that is substantially equivalent to sand or soil that is indigenous to the coastal location.

11. The method of claim 1, further comprising covering the biodegradable mat with a layer of sand or soil.

12. The method of claim 1, wherein the site-compatible mat consists only of a biodegradable mat, combined at most with fertilizer.

* * * * *